United States Patent [19]

Hajduch

[11] 4,212,116
[45] Jul. 15, 1980

[54] TRAINING APPARATUS FOR VISUALLY IMPAIRED PERSON

[76] Inventor: James D. Hajduch, 1703 Carolina Ave., Whiting, Ind. 46394

[21] Appl. No.: 9,740

[22] Filed: Feb. 5, 1979

[51] Int. Cl.² ............................................. G09B 21/00
[52] U.S. Cl. ............................ 35/29 R; 273/DIG. 27; 340/556
[58] Field of Search ................... 35/29 R, 29 B, 29 D, 35/29 F, 35 A; 273/186 RA, 192, DIG. 27; 340/556, 573, 600, 557

[56] References Cited

U.S. PATENT DOCUMENTS

| | | | |
|---|---|---|---|
| 2,099,868 | 11/1937 | Sing | 340/556 X |
| 3,596,103 | 7/1971 | Matthews | 340/556 X |
| 3,781,009 | 12/1973 | Gagnon | 273/DIG. 27 X |
| 3,801,108 | 4/1974 | Murray | 273/186 R A |

OTHER PUBLICATIONS

Light Beams Sound Buzzer to Guide the Blind, p. 528, Oct. 1940, Popular Mechanics.

Primary Examiner—Harland S. Skogquist
Attorney, Agent, or Firm—Sabin C. Bronson

[57] ABSTRACT

An apparatus to improve the mobility of a visually impaired person comprises first and second exciter systems placed on either side of the person and acting to produce light beams which are received by corresponding first and second receivers, and first and second sound devices each with the corresponding associated receiver to produce a distinctive sound when the light beam is interrupted before getting to the receiver. In a preferred embodiment, the apparatus includes a cane held by the person so that as the cane is moved into the path of the light beam, the light beam is interrupted. The sounds, or lack thereof, which accompany the movement of the person and/or the cane provide an indication to the person whether the cane is being used properly and/or whether the person is walking in a straight line, e.g., between the light beams.

10 Claims, 7 Drawing Figures

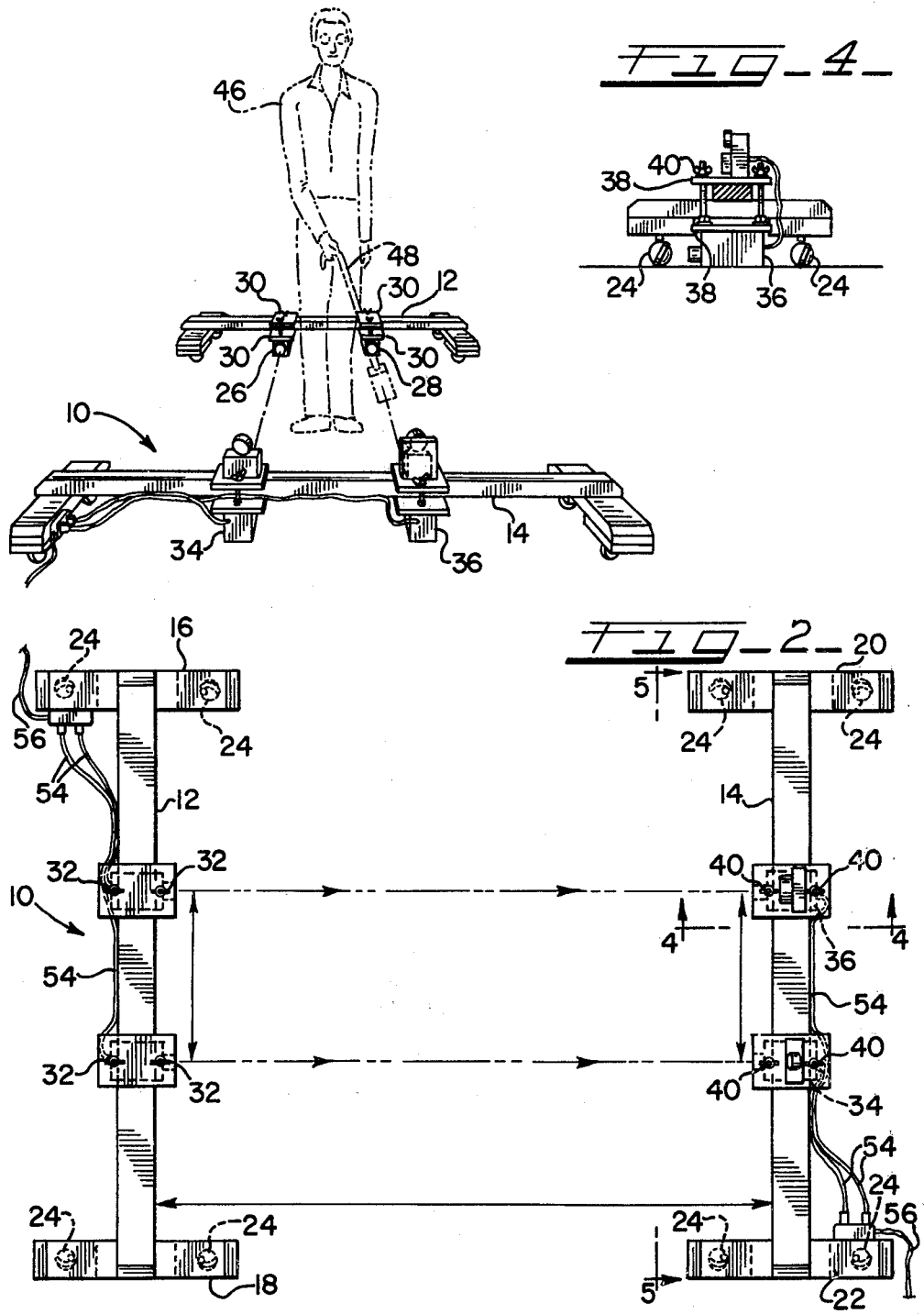

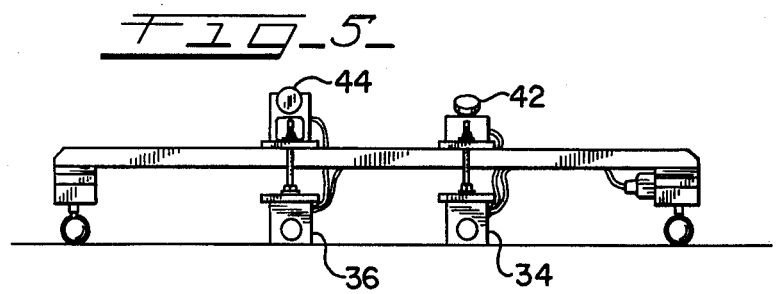
FIG_5_
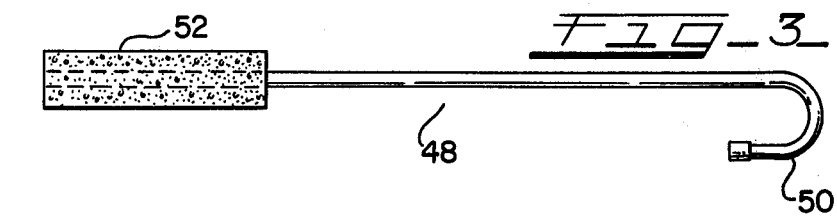
FIG_3_
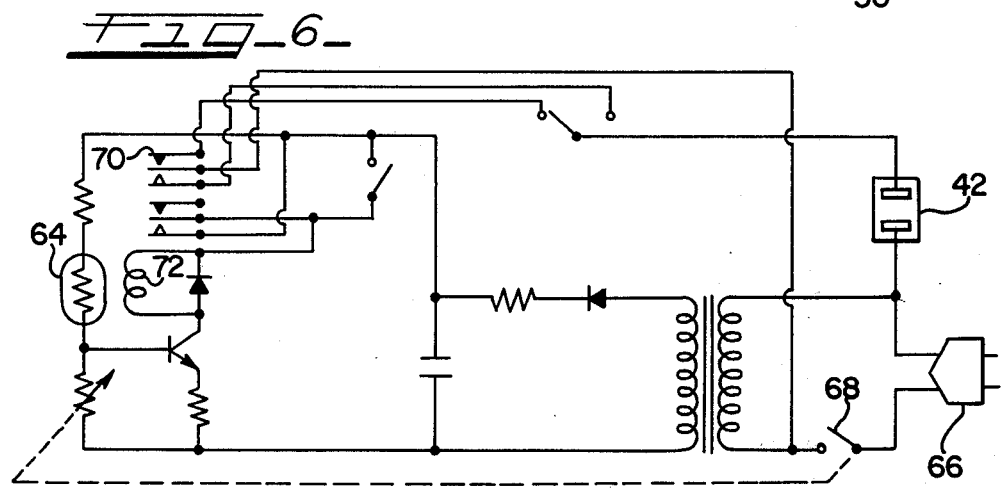
FIG_6_
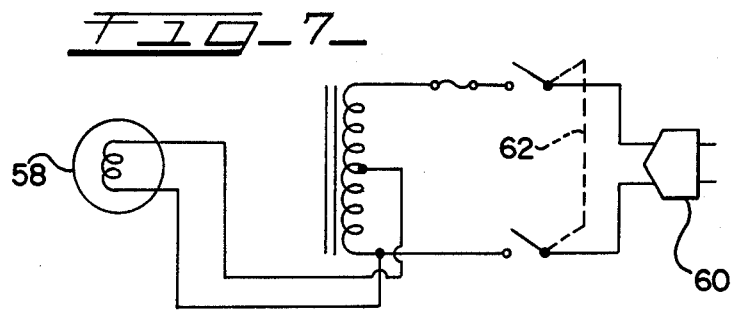
FIG_7_

TRAINING APPARATUS FOR VISUALLY IMPAIRED PERSON

BACKGROUND AND SUMMARY OF THE INVENTION

The present invention relates to an apparatus to aid the visually impaired. More particularly, this invention relates to an apparatus useful in training a visually impaired individual to have improved mobility.

One of the most severe handicaps a person with impaired vision often encounters is a lack of mobility. For example, such an individual may have trouble walking in a straight line or walking without hitting objects. A cane may be used to help alleviate the latter problem but the cane must be used properly if the visually impaired individual is to avoid endangering himself and others. Other activities, including recreational games, are more easily accomplished if the visually impaired person has substantial mobility.

Therefore, one object of the present invention is to provide an apparatus to improve the mobility of visually impaired individuals.

Another object of the present invention is to provide an improved training apparatus for visually impaired individuals.

An additional object of the invention is to provide an apparatus useful in teaching a visually impaired person the proper use of "arcing" of a cane.

A still further object of the invention is to provide an apparatus useful to train a visually impaired person how to walk or run in a substantially straight path. These and other objects of the present invention will become apparent hereinafter.

An improved apparatus useful in instructing a visually impaired person has now been discovered. This apparatus comprises first and second exciter systems, each such system capable of producing a light beam. First and second receivers are situated a distance away from the exciter systems so that each of the first and second receivers is capable of receiving the light beam produced by the first and second exciter systems, respectively. The first and second exciter systems are spaced apart a sufficient distance to allow a visually impaired individual to stand, walk or run, as desired, on the floor between the two systems without interrupting the light beam from either of the exciters. In addition, first and second sound devices are associated with the first and second receivers, respectively. Each of these sound devices acts to produce a distinctive, and preferably different, sound in response to the interruption of the light beam to the corresponding receiver.

In one particularly preferred embodiment, the present apparatus further includes a cane, stick and the like adapted to be hand held by the person using the machine. This cane is capable of being moved by the user in such a manner to interrupt the light beams to the receivers, thereby causing a distinctive sound to be produced.

In general, the apparatus functions as follows: The visually impaired user, with cane in hand, is properly positioned and the machine is activated so that light beams travel uninterruptedly from each of the exciter systems to the corresponding receiver. Preferably, exciter systems and receivers are positioned so that the light beams travel in substantially parallel paths.

The user may practice walking in a straight line between the light beams. If a distinctive sound is heard, the user knows he has veered from the straight line and either his cane or his person has interrupted one of the light beams. In a preferred embodiment where different sounds are produced, the user is able to determine whether he has veered right or left. By continued practicing with the machine, the user is better able to walk a straight line, i.e., without interrupting either of the light beams.

Cane "arcing" can be practiced using the present apparatus. Cane "arcing" involves the side to side movement of a cane by a visually impaired person to determine the presence of objects in the person's path. The magnitude of this movement, or arc, should be slightly greater than the shoulder-to-shoulder width of the user. For example, the proper arc for the cane may be equal to a distance of the shoulder-to-shoulder width of the user plus above one (1) inch on either side.

In order to practice cane "arcing," the spacing of the exciter systems and receivers is set so that the distance between the two light beams is equal to the desired cane arc. In this embodiment, the light beams travel or run directly above the floor so that the cane must be in contact with the floor when the cane interrupts either light beam. The visually impaired person is properly positioned between the light beams and begins moving or arcing his cane. If the arcing is proper, the user should hear a distinctive and preferably different, sound (from the sound devices) each time the cane contacts the floor (and interrupts a light beam) at either end of the arc. If the user has to move the cane out further from his body before hearing a sound, he knows that his arc is too short on that side. If, on the other hand, he must move the cane, in contact with the floor, toward his body before a sound is produced, he is made aware that his arc is too long on the particular side (right or left) involved. Different sounds from each of the sound devices help the user to recognize which side of his arc, for example, may be too short or long.

The present apparatus provides unexpected and surprising benefits to the visually impaired. For example, this system may be used effectively to improve mobility and may be used without supervision, for example, by a sighted person. The exciter systems, receivers and sound devices may be comprised of conventional, e.g., electronic, components which are easily assembled and do not require extensive amounts of maintenance. In short, the present invention represents an efficient and effective means to improve the mobility and, more important, the self confidence of the visually impaired.

If desired, the present system may include mounts for the exciter systems and receivers. For example, two portable (on wheels) mounts may be provided, one mount carrying the exciter systems and the other mount carrying the receivers and sound devices. The mounts are preferably portable so that the distance between exciter and receiver is adjustable. This distance may be quite large, e.g., about 10 feet to about 70 feet or more, if the user is practicing walking or running in a straight line, but may be substantially smaller if cane "arcing" is practiced and the user's feet are substantially stationary.

The exciter systems and receivers are preferably positioned so that the light beams travel at a height of less than about one (1) foot from the floor occupied by the user. This height is preferably adjustable, as desired. As noted previously, in one preferred embodiment, the exciters and receivers are positioned so that the light beams run directly along, i.e., directly above, the floor.

If a cane is used in this embodiment, the cane contacts the floor when the cane interrupts the light beam.

In a further preferred embodiment, the cane is adapted for use in the present invention. That is, preferably, the cane includes a handle portion and a bottom portion which is widened, relative to the handle portion, to promote interrupting of the light beams, for example, as the bottom portion of the cane contacts the floor.

In order to achieve increased flexibility in use, the present apparatus preferably provides that the distance between the two exciter system receiver sets is adjustable. That is, the distance between the paths of the two light beams is preferably capable of being varied so that the apparatus may be used by different sized persons to practice cane "arcing" and also to practice walking in a straight line (which may involve separating the paths of the light beams a greater distance than when cane "arcing" is practiced). The distance between the light beam paths may be for example, in the range of about one (1) foot or less to about five (5) feet or more depending on the particular person using the apparatus and the use involved. Preferably, the exciter systems and receivers are positioned so that the paths of the light beams are substantially mutually parallel.

The light beams produced by the exciter means may, but need not be, made up of light in the visible range. What is necessary is that the light beams be capable of being received by the receivers (which preferably involve photoelectric cells) and interrupted, e.g., by a cane held by the person using the apparatus. Thus, the light beams may have wave lengths in either the visible or invisible range.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a perspective view showing a visually impaired person using an apparatus according to the present invention.

FIG. 2 is a top plan view of the apparatus shown in FIG. 1.

FIG. 3 is a side elevational view of the cane shown being held by the visually impaired person in FIG. 1.

FIG. 4 is a view, partly in cross section, taken along line 4—4 of FIG. 2.

FIG. 5 is a view taken along line 5—5 of FIG. 2.

FIG. 6 is a generalized circuit diagram for the receiver-sound device combinations used in the apparatus shown in FIG. 1.

FIG. 7 is a generalized circuit diagram for the exciter systems used in the apparatus shown in FIG. 1.

DESCRIPTION OF THE PREFERRED EMBODIMENT

Referring now to the drawings, the present training machine shown generally at 10, includes a first mounting element 12 and a second mounting element 14 which are secured to first cross arms 16 and 18, and second cross arms 20 and 22, respectively. Each of these cross arms 16, 18, 20 and 22 have casters 24 appended to the underside thereof. These casters 24 contact the floor and allow mounting elements 12 and 14 to be moved if desired. For example, in this manner the distance between the first and second mounting elements 12 and 14 can be varied to vary the path of the light beams, described hereinafter. The mounting elements 12 and 14, and the cross arms 16, 18, 20 and 22 may be made of any suitable material, for example, wood.

Secured to the underside of first mounting element 12 are first and second light sources 26 and 28. The light sources 26 and 28 are secured to first mounting element 12 by means of boards 30 and wing nut assemblies 32. Light sources 26 and 28 can be independently moved along first mounting element 12 so that the distance between first light source 26 and second light source 28 can be varied as desired. First and second light sources 26 and 28 as shown in the drawings each produce a beam of light which travels directly along the floor toward first and second light receivers 34 and 36, respectively.

First and second light receivers 34 and 36 are secured to the underside of second mounting element 14 by means of boards 38 and wing nut assemblies 40. First and second light receivers 34 and 36 may be moved independently along second mounting element 14 and, thus, the distance between the two light receivers 34 and 36 may be varied as desired.

If desired the wing nut assemblies 32 and 40 can be adjusted to raise the light sources 26 and 28, and light receivers 34 and 36 off the floor. Thus, the height at which the light beams travel from the light sources 26 and 28 to the light receivers 34 and 36, respectively, is adjustable. The light sources 26 and 28 and the light receivers 34 and 36 are positioned on the first and second mounting elements 12 and 14, respectively, so that the paths of these light beams are mutually parallel.

A bell 44 mounted on a board 38, is associated with first light receiver 34, while a buzzer 42 (capable of producing a different sound from that produced by bell 44 is associated with second light receiver 36 and is mounted on a different board 38. The functioning of bell 44 and buzzer 42 will be described in detail hereinafter.

As shown in FIG. 1, the visually impaired person 46 is holding a cane 48. This cane 48 is shown in more detail in FIG. 3. Cane 48 includes a handle 50 and a bottom portion 52 which is widened relative to the handle 50 and is capable of interrupting the light beams between the light sources 26 and 28 and the light receivers 34 and 36, respectively.

Each of the light sources 26 and 28 and light receivers 34 and 36 (and associated bell 44 and buzzer 42) are electrically powered and receive such power from wires 54 and 56.

The generalized circuit diagrams for the light receivers 34 and 36 (and associated bell 44 and buzzer 42), and light sources 26 and 28 are shown in FIGS. 6 and 7, respectively. Each of these circuit diagrams involve conventional electronic components and symbols and the functioning of such circuits is readily understood by those skilled in the art. Therefore, a brief description of each of these circuits is as follows:

Referring to FIG. 7, light bulb 58, when activated by inserting plug 60 into a source of electrical power and closing double throw switch 62, emits the light which creates the light beam identified with light sources 26 and 28.

The circuit diagram corresponding to the light receivers 34 and 36 (and associated bell 44 and buzzer 42) shown in FIG. 6 involves a photo-electric cell 64. The circuit is activated by inserting plug 66 into a source of electrical power and closing switch 68. As long as photoelectric cell 64 senses light from light source 26 or 28 relay contact 70 is inactivated and bell 4 (or buzzer 42) is silent. If the light beam from the light source 26 or 28 is interrupted, photo-electric cell 64 will become deactivated and electrical power will activate relay coil 72 which, in turn, acts to close relay contact 70 resulting in the ringing of bell 44 (or the buzzing of buzzer 42). In short, when the light beam to photo-electric cell 64 is interrupted, bell 44 rings (or buzzer 42 buzzes).

The present machine 10 functions as a training device for proper "cane arcing" as follows:

The first and second mounting elements 12 and 14 are placed so that the person 46 can stand comfortably between them. The light sources 26 and 28 and the light receivers 34 and 36 are positioned on the mounting element 12 and 14, respectively, so that parallel light beams from light source 26 to light receiver 34 and from light source 28 to light receiver 36 are produced about one (1) inch outside either shoulder of the person 46.

The person 46 then practices "cane arcing". If a proper arc is being used the bell 44 and buzzer 42 will sound immediately as the cane 48 held by the person 46 contacts the floor on either side. If the cane 48 must be moved in contact with the floor away from the person 46 before the bell 44 (or buzzer 42) sounds, the person 46 knows that the arc is too shallow. If the cane 48 must be drawn back toward person 46 in contact with the floor before the light beam is interrupted and bell 44 (or buzzer 42) sounds, person 46 knows that the arc of the cane is too long. Because of the different bell and buzzer sounds, person 46 knows which side of the cane arc is most troublesome. Continued practice should lead to improved cane "arcing".

Walking in a straight line is practiced as follows: Mounting elements 26 and 28 are separated, e.g., by about 45 feet, so that person 46 may comfortably walk therebetween. The distance between the two light sources 26 and 28 and light receivers 34 and 36 is adjusted so that the distance between the two light beams simulates the width of public sidewalk, e.g., about five (5) feet. Person 46 walks, with cane 48 in hand, between mounting elements 12 and 14. If no bell or buzzer sound is produced, person 46 knows he has walked in a reasonably straight line. If bell 44 and/or buzzer 42 sounds, person 46 knows that at least one of the light beams has been interrupted and that he has strayed from a straight line. Person 46 also knows, by whether the bell 44 or buzzer 42 sounds, whether he has veered to his right or left. Continued work on machine 10 should improve walking ability.

While this invention has been described with respect to various specific examples and embodiments, it is to be understood that the invention is not limited thereto and that it can be variously practiced within the scope of the following claims.

I claim:
1. An apparatus to aid in instructing a visually impaired person comprising: a first and second exciter means, situated as set forth hereinafter, each of said exciter means capable of producing a light beam; a first and second receiver means, situated a distance away from said exciter means so that each of said first and second receiver means is capable of receiving said light beam produced by said first and second exciter means, respectively, said first and second exciter means being spaced apart a sufficient distance to allow said person to stand or walk on the floor therebetween, without interrupting the light beam from either of said exciter means to said corresponding receiver means; and a first and second sound means associated with said first and second receiver means respectively, each of said sound means acting to produce a distinctive sound in response to the interruption of said light beam to said corresponding receiver means.

2. The apparatus of claim 1 wherein each of said first and second sound means acts to produce a different distinctive sound in response to the interruption of said light beam to said corresponding receiver means.

3. The apparatus of claim 2 wherein said exciter means and said receiver means are situated so that said light beams from said exciter means to said receiver means travel at a height of less than about one (1) foot from said floor.

4. The apparatus of claim 3 wherein said light beams from said exciter means run directly along said floor.

5. The apparatus of claim 1 which further comprises cane means adapted to be hand held by said person and being capable of being moved by said person to interrupt said light beams to said receiver means, thereby causing a distinctive sound to be produced.

6. The apparatus of claim 5 wherein said light beams from said exciter means run directly along said floor and said cane means contacts said floor when said cane means interrupts said light beam.

7. The apparatus of claim 5 wherein said cane means includes a handle portion and a bottom portion and said bottom portion is widened, relative to said handle portion, to promote interrupting said light beams.

8. The apparatus of claim 1 wherein the height above said floor at which said exciter means and said receiver means are situated is adjustable.

9. The apparatus of claim 1 wherein the distance the light beams travel before being received by said receiver means is adjustable.

10. The apparatus of claim 1 wherein the distance between said first exciter means receiver means set and said second exciter means—receiver means set is adjustable.

* * * * *